United States Patent [19]
Schmidt

[11] Patent Number: 5,927,664
[45] Date of Patent: Jul. 27, 1999

[54] METHOD AND APPARATUS FOR CLEANING TILT-IN, DOUBLE-HUNG WINDOWS

[76] Inventor: Charles J. Schmidt, 1106 Gregg St., Philadelphia, Pa. 19115

[21] Appl. No.: 08/352,513

[22] Filed: Dec. 9, 1994

[51] Int. Cl.[6] .................................................. F16M 11/00
[52] U.S. Cl. .................. 248/176.1; 52/127.2; 248/176.3
[58] Field of Search .............................. 248/125.9, 125.8, 248/125.7, 122.1, 176.3, 177.1, 176.1, 171, 676, 292.14, 351; 52/127.2, 745.15, 745.16; 49/181, 507

[56] References Cited

U.S. PATENT DOCUMENTS

| | | | |
|---|---|---|---|
| 575,543 | 1/1897 | Clarke | 248/166 |
| 1,130,975 | 3/1915 | Hopper et al. | 248/166 |
| 1,199,770 | 10/1916 | Elphinstone | 248/161 |
| 3,233,517 | 2/1966 | Morrison | 248/166 |
| 4,165,856 | 8/1979 | Wisehart | 248/449 |
| 4,520,981 | 6/1985 | Harrigan | 248/413 |
| 4,605,193 | 8/1986 | Kuparinen | 248/460 |
| 4,684,091 | 8/1987 | Moreschi | 248/166 |
| 4,712,756 | 12/1987 | Kester | 248/165 |
| 4,763,865 | 8/1988 | Danner | 248/164 |
| 4,856,929 | 8/1989 | Smahlik | 403/297 |

*Primary Examiner*—Ramon O. Ramirez
*Assistant Examiner*—Anita M. King
*Attorney, Agent, or Firm*—LaMorte & Associates

[57] ABSTRACT

A static support device and associated method used to position tilt-in windows into an orientation that is ergonomically efficient for washing. The static support device includes an adjustable elongated member that is held in a vertical orientation by a free standing stand. A cross member is pivotably coupled to the top of the elongated member, wherein the cross member can be locked into an orientation that is generally perpendicular to the vertically supported elongated member. As a result, the overall static support device can assume a free standing T-shaped configuration. The static support device is positioned adjacent to a tilt-in window, whereby the sashes of the window can be tilted to a point where the sash rests upon the cross member. The cross member is padded to prevent damage to the sash. Furthermore, the slip stop elements extend upward from the cross member that engage the frame of the sash. The engagement between the sash and the cross member prevent the static support from inadvertently moving away from the sash as the window is being washed.

11 Claims, 5 Drawing Sheets

METHOD AND APPARATUS FOR CLEANING TILT-IN, DOUBLE-HUNG WINDOWS

BACKGROUND OF THE INVENTION

1. Field of the Invention

The present invention relates to devices for use with double-hung windows that have a sash tilt-in feature, wherein the present invention is capable of supporting a window sash when tilted into a horizontal plane. More particularly, the present invention relates to static supports that are adjustable in height and are capable of engaging both a tilted window sash and the floor, thereby holding the sash in a position where the sash can be easily cleaned.

2. Prior Art Statement

Most residential homes have double-hung windows consisting of two sashes that slide up and down in a frame. Modern new construction windows and double-hung replacement windows often have a tilt-in feature that enables each of the sashes to be tilted into the house for easy cleaning. Double-hung windows with tilt-in features thereby enable the orientation of the sashes to be changed from their normal vertical position to a position near the horizontal. This allows a person to easily clean the window sashes from the inside of the home.

One of the most common problems associated with typical tilt-in window sashes is that there is no restraint on how far the sash can be tilted into the house. Referring to FIG. 1, it can be seen that a double-hung window 10 in a residential setting typically includes a sill 12. As the lower sash 14 is pivotably rotated into the house, there is nothing to stop the rotation of the sash 14 until the sash 14 abuts against the sill 12. This may cause damage to both the sash 14 and the sill 12. The abutment of the sash 14 against the sill 12 also provides a very poor support for the sash 14. In many situations the glass 16 within the sash 14 actually contacts the sill 12. Accordingly, as a person is washing the glass 16 within the sash 14, any excess pressure that is applied to the sash 14 may damage the sash 14 or cause the glass 16 within the sash to break. To avoid these problems, people typically hold a tilted sash 14 in a generally horizontal position as they wash the glass 16. This leaves the person washing the glass 16 with only one hand to do the job since the other hand is being used to support the sash 14. Many sashes are heavy. Accordingly, the job of washing the windows becomes wearisome. Often by accident, or induced by fatigue, people drop the sash 14 allowing the sash 14 to strike the below lying sill 12. This, of course, causes the glass 16 to break or otherwise damages the sash 14 or sill 12. If a person drops the upper sash 18, the upper sash 18 will rotate and strike against the lower sash 14 causing the glass in both sashes to break.

The upper sashes in a window are more difficult to wash than are the lower sashes because a person is often caused either to work over his/her head or stand on a chair to reach the level of the upper sash. Such work is very tiresome and dangerous, thereby causing many accidents. A need therefore exists in the art for a static support that can be used to support a sash in a horizontal position unassisted, thereby enabling a person washing the windows to be able to position the sashes in an ergonomically efficient orientation and enabling that person to use both hands in washing the windows. With the use of two hands, a person washing the windows would be less likely to fall from a support, less likely to damage the windows and less likely to become fatigued.

Over the years, static supports have been developed for a countless number of applications. However, none have been developed to specifically address the unique needs required for supporting the sash of a tilt-in window. For example, U.S. Pat. No. 575,543 to Clarke, entitled FOLDING TRESTLE shows a free standing support with a long top horizontal member. Supports such as this lack vertical adjustability. They also lack some type of device for engaging the structure of an open sash and they lack a cushioned surfaces needed to support the sash without damage.

U.S. Pat. No. 4,520,981 to Harrigan, entitled ADJUSTABLE TELESCOPIC SUPPORT shows a static support with vertical adjustability and a horizontal top member. However, such supports lack a top member capable of engaging the physical structure of a sash in a manner that will not damage the sash or the glass within the sash.

U.S. Pat. No. 4,763,865 to Danner, entitled FOLDABLE KEYBOARD STAND shows a static support with a padded top, however, the support lacks vertical adjustment. Furthermore, there is no structure available that is capable of engaging the edge of a window sash in a manner that would protect the sash and prevent the sash from inadvertently moving.

It is therefore an object of the present invention to provide a stand specifically adapted to engage and support the sash of a tilt-in double-hung window.

It is a further object of the present invention to provide a method of cleaning a sash of a double-hung window utilizing a static support.

The above objects are provided for by the present invention as described and claimed below.

SUMMARY OF THE INVENTION

The present invention is a static support device and associated method used to position tilt-in windows into an orientation that is ergonomically efficient for washing. The present invention includes an adjustable elongated member that is held in a vertical orientation by a free standing stand. A cross member is pivotably coupled to the top of the elongated member, wherein the cross member can be locked into an orientation that is generally perpendicular to the vertically supported elongated member. As a result, the overall static support device can assume a free standing T-shaped configuration.

The static support device is positioned adjacent to a tilt-in window, whereby the sashes of the window can be tilted to a point where the sash rests upon the cross member. The cross member is padded to prevent damage to the sash. Furthermore, the slip stop elements extend upward from the cross member that engage the frame of the sash. The engagement between the sash and the cross member prevent the static support from inadvertently moving away from the sash as the window is being washed.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The present invention device and method can be used in conjunction with any type of tilt-in window regardless of how many sashes are included as part of the window's design. Accordingly, it will be understood that the present invention device and method may be used in conjunction with a double-hung window, a single-hung window, an awning window or any specialty tilt-in window. For the purposes of the below provided description, the present invention device and method will be described in conjunction with a double-hung window, since this type of window is the most prevalent in American homes.

Figure 1:
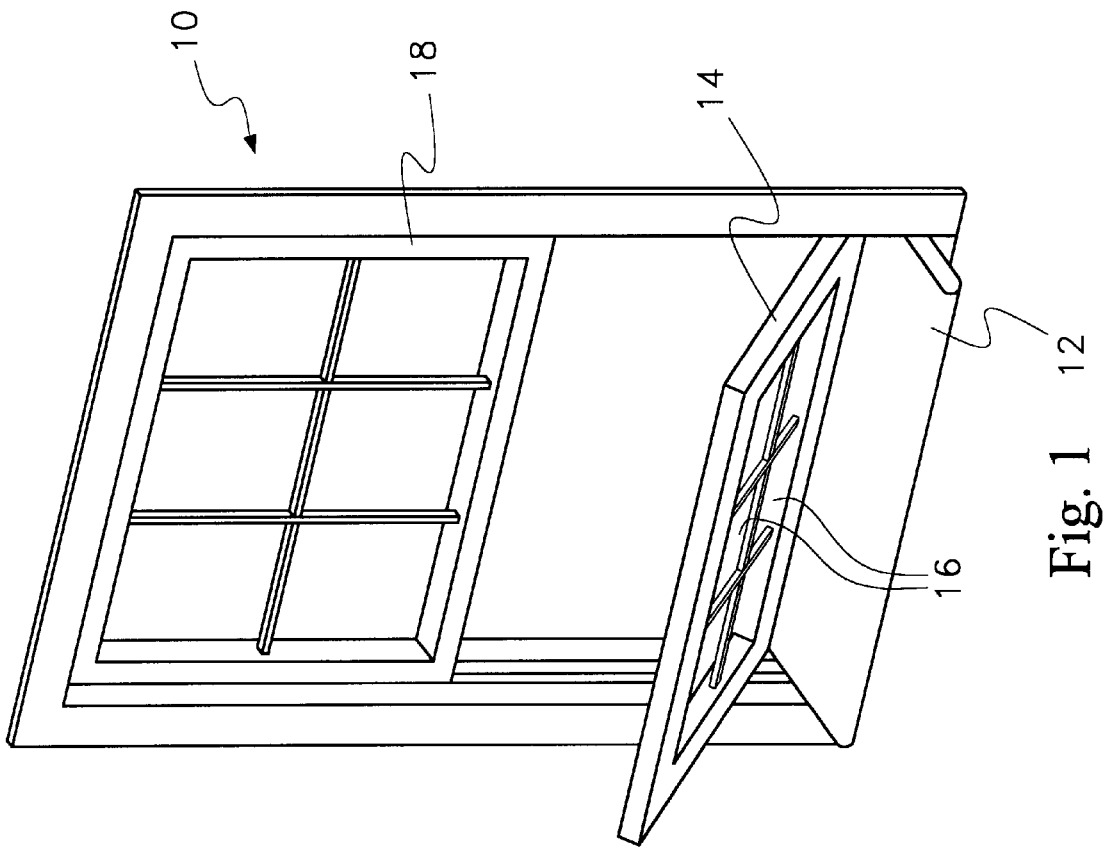
FIG. 1 is a perspective view of a typical prior art double-hung window with tilt-in sashes.
Figure 2:
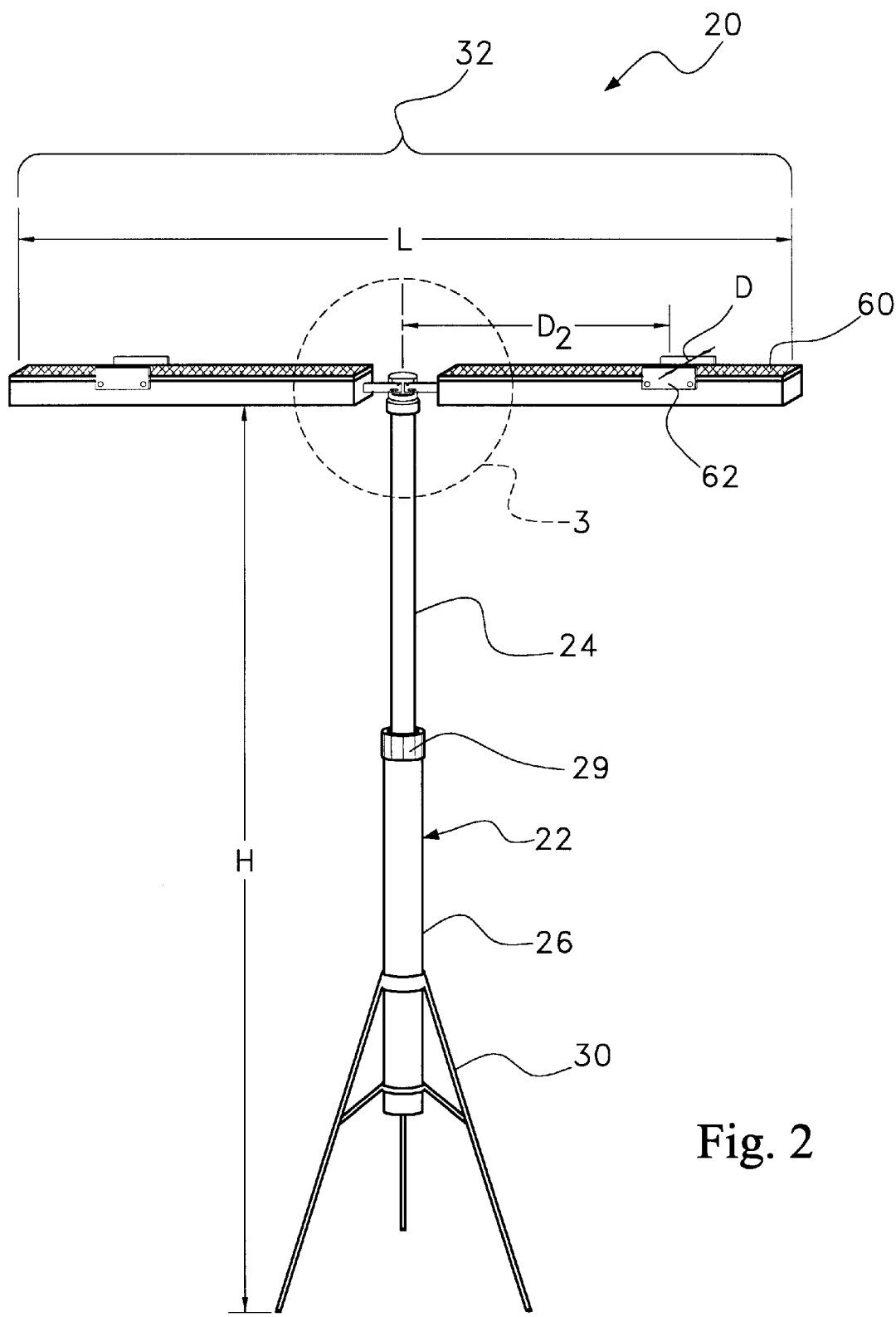
FIG. 2 is a perspective view of one preferred embodiment of the present invention static support.

Referring to FIG. 2, an exemplary embodiment of the present invention static support 20 is shown. The static support 20 includes an adjustable vertical member 22. In the shown embodiment, the vertical member 22 includes an upper tubular element 24 that passes into the center of a lower tubular element 26 in a telescopic fashion. As such, the overall height H of the static support 20 can be adjusted within a predetermined range. The upper tubular element 24 is locked into position relative the lower tubular element 26 by a collar 29 that can be manually tightened or loosened. The use of a collar 29 to lock two telescoping tubular elements in place is a known technology that need not be set forth herein in detail. Furthermore, it should be understood that the use of tubular elements is merely exemplary and the vertical member 22 can be made of overlapping wood pieces or any other known configuration and composition that would enable the height H of the overall vertical member 22 to be adjusted as desired by the person using the present invention static support 20.

A tripod support 30 is disposed at the bottom of the lower tubular element 26. The tripod support 30 enables the static support 20 to be free standing on a flat surface. The tripod support 30 is preferably collapsible to reduce the size of the overall support for easy storage. The use of a tripod support 30 is also merely exemplary and any other base structure capable of making the overall static support 20 free standing may also be used. For instance, a permanent wide base stand may be formed at the bottom of the vertical member 22 or a removable stand may be selectively joined to the bottom of the vertical member 22. The prior art is replete with stand devices capable of retaining an elongated object in a vertical orientation. Any such known stand may therefore be used to support the vertical member 22 in the present invention.

A cross member 32 is coupled to the vertical member 22 at its upper most end. In the shown embodiment the cross member 32 has two segments. However, in alternate embodiments the cross member can be solid. The cross member 32 has an overall length L, wherein the cross member 32 joins to the vertical member 22 at a point generally in the center of the length L. In the preferred construction, the cross member 32 is pivotably joined to the vertical member 22. If the cross member has two segments, each segment is pivotably coupled to the vertical member 22. If the cross member were solid, it would be pivotably coupled to the vertical member 22 at its midpoint. As such, the cross member 32 would be able to be rotated between a vertical orientation, in line with the vertical member 22, or a horizontal orientation at a perpendicular to the vertical member 22. It will therefore be understood that in its simplest form, the cross member 32 can be a solid shaft that may be joined to the vertical member 22 with a single pivot bolt. As such, the cross member 32 would be free to rotate about that pivot bolt. Such a construction is particularly useful if both the vertical member 22 and the cross member 32 were wood. In such a construction, a common hole need only be drilled though the two members, wherein a bolt could be passed through the common hole to pivotably join the vertical member 22 and the cross member 32.

Figure 3:
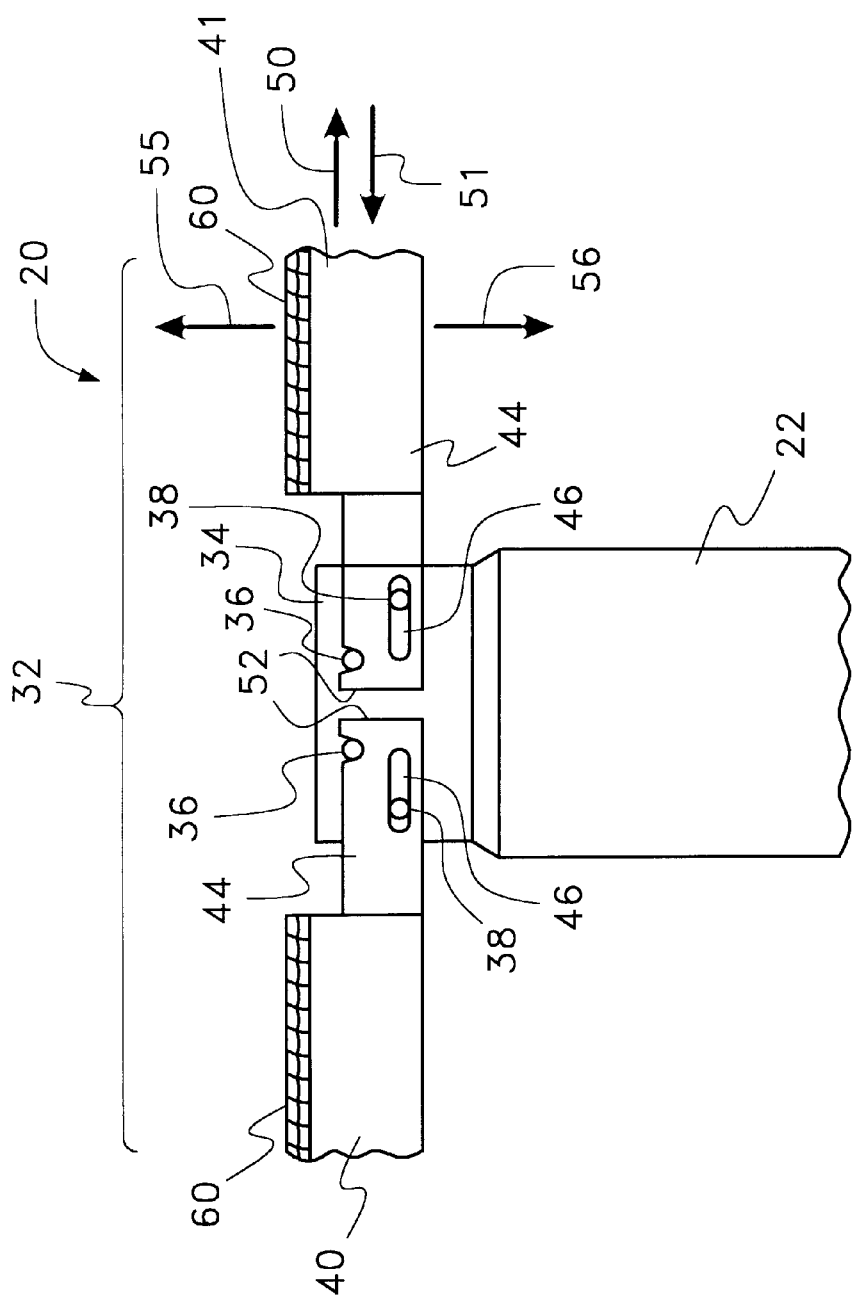
FIG. 3 is a enlarged front view of a segment of the present invention static support shown in region 3 of FIG. 2.

Referring to FIG. 3 in conjunction with FIG. 2, it can be seen that in the shown exemplary embodiment, the upper tubular element 24 terminates at its highest end with a planar support 34. Four pins extend from one side of the planar support 34. The four pins include two locking pins 36 and two pivot pins 38. The cross member 32 in this embodiment is not a single piece, but is rather two separate members 40, 41 that each separately join to the vertical member 22 in a pivotable manner. As a result, either one or both of the members 40, 41 can be rotated into a position at a perpendicular to the vertical element 22. This enables the present invention static support 20 to fit into much more confined spaces than would a static support with a solid cross member.

In FIG. 3, it can be seen that the left cross member 40 and the right cross member 41 each terminate at one end with a hook structure 44. An elongated slot 46 is disposed through both cross members 40, 41 in the area of the hook structure 44. The pivot pins 38 from the planar support 34 pass through the corresponding elongated slot 46, thereby pivotably joining the left and right cross members 40, 41 to the planar support 34 on the top of the tubular element 24. Since the elongated slots 46 are longer than the pivot pins 38, the left and right cross members 40, 41 can move back and forth in the directions of arrows 50 and 51. The limits of the reciprocal movement are defined by the length of the slots 46 and the positions where the pivot pins 38 engage the sides of the slots 46.

A hook projection 52 extends from each of cross members 40, 41. The hook projections 52 may or may not engage the locking pins 36 depending upon the relative position of the pivot pin 38 in the elongated slot 46. For instance, if the left or right cross members 40, 41 were lifted up in the direction of arrow 55 and pulled in the direction of arrow 50, the hook projections 52 would no longer engage the locking pins 36. Once free of engagement with the locking pins 36, the cross members 40, 41 are free to rotate in the direction of arrow 56 until the left and right cross members 40, 41 also lay in a generally vertical orientation. It will therefore be understood that by rotating the cross members 40, 41 in the direction of arrow 55 and pushing inwardly in the direction of arrow 51, the hook projections 52 can again be made to engage the locking pins 36 and either or both of the cross members 40, 41 can be locked into an orientation that is generally perpendicular to the vertical member 22.

Each of the cross members 40, 41 has a flat upper surface 60 that is padded. The padding can be any soft, durable material such as an elastomeric foam, padded cloth or carpeting. As is seen in FIG. 2, slip stop elements 62 extend upwardly over the upper surface 60 of each of the cross members. These slip stop elements 62 are preferably made of a soft plastic or a synthetic elastomeric material for a purpose which will be later explained. In the shown embodiment, the slip stop elements 62 are positioned a distance D apart from one another and a distance D2 from the longitudinal axis of the vertical member 22. Although not shown, it will be understood that in alternate embodiments of the present invention, the cross members 40, 41 can be formed so that the distance D between the slip stop elements 62 is adjustable as is the distance D2 from the longitudinal axis of the vertical member 22 to the slip stop elements 62. The prior art is replete with mechanisms that would enable such adjustments. Any such prior art technology could therefore be applied to the present invention to allow for such adjustments.

Figure 4:
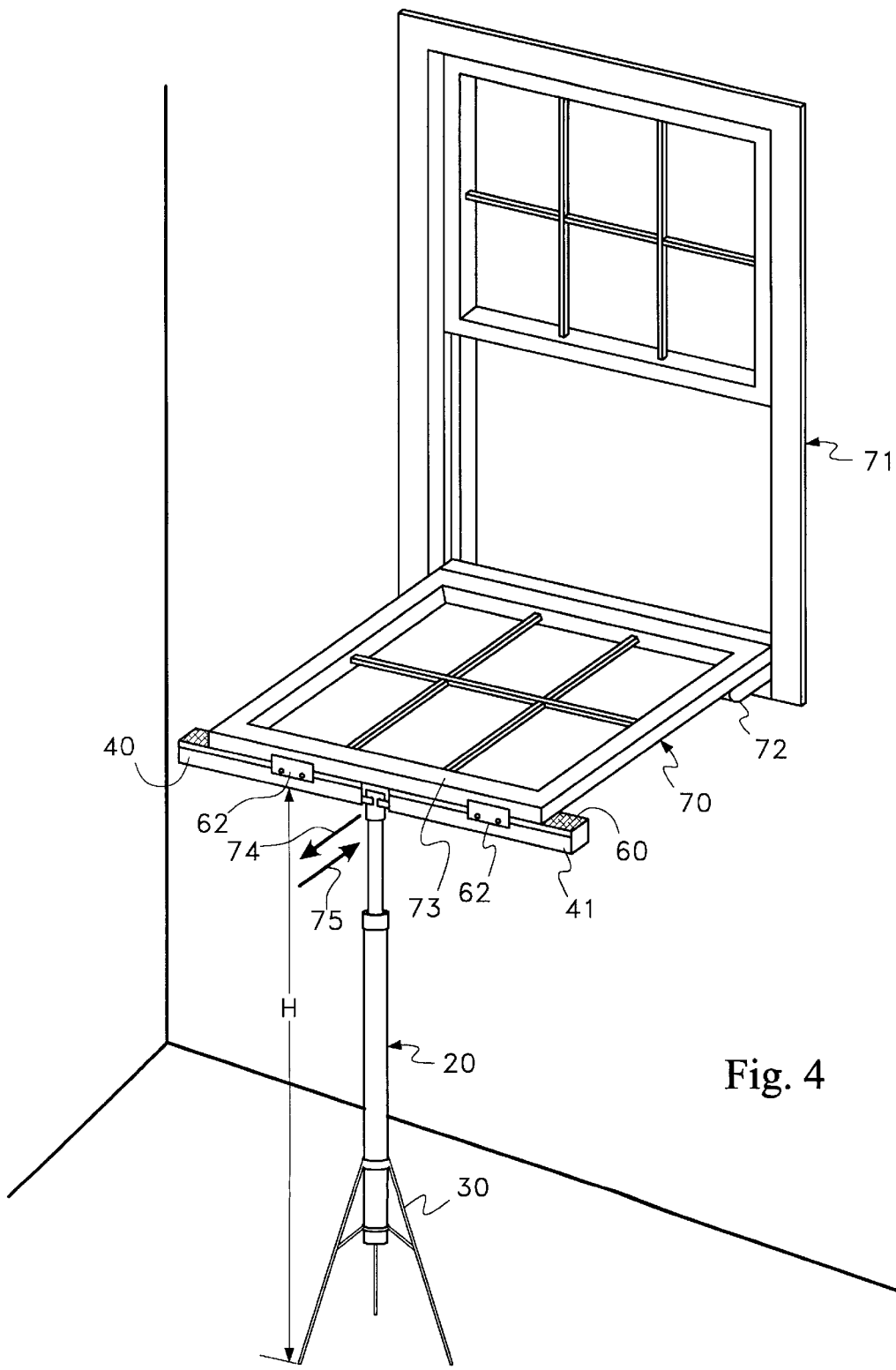
FIG. 4 is a perspective view of the embodiment of the present invention shown in FIG. 2, shown in conjunction with a tilt-in window to facilitate further consideration and to demonstrate the method of use.

Referring to FIG. 4, it can be seen that the present invention static support 20 is intended to support the sash 70 of a tilt-in window 71 in a position that is ergonomically efficient for cleaning, yet prevents the sash 70 from becoming damaged by abutting against the window sill 72. In use, the peripheral framing 73 of the sash 70 rests upon the padded flat upper surface 60 of the cross members 40, 41. The slip stop elements 62 extend over the inner and outer edges of the peripheral framing 73. As a result, the overall static support 20 is prevented from inadvertently sliding out from below the sash 70 in the directions of arrows 74 and 75. By resting the tripod support 30 on the floor and adjusting the height H of the vertical member 22, the sash 70 can be supported at whatever height is most comfortable for the user. Once opened and supported by the vertical member 22, the sash 70 can then be washed without need for further support. Accordingly, a person washing the windows has two free hands to complete the task.

Figure 5:
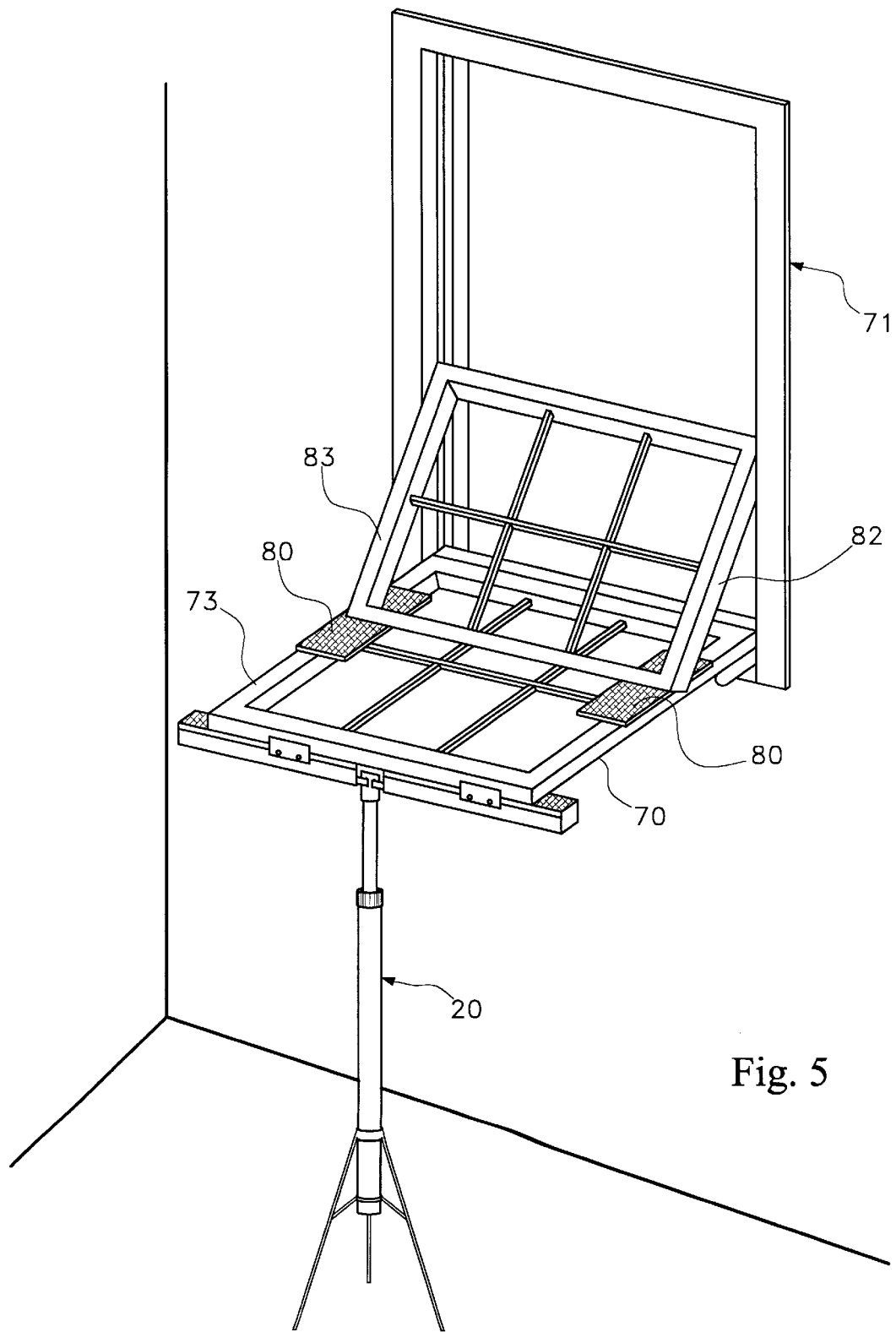
FIG. 5 is a perspective view of the embodiment of the present invention shown in FIG. 2, shown in conjunction with a tilt-in window wherein both the upper and lower sashes are supported by the present invention.

Referring to FIG. 5, at least one padding element 80 is provided for use in conjunction with the present invention static support 20. The padding elements 80 are used as part of the method of cleaning both the upper sash 82 and the lower sash 70 of the tilt-in double-hung window 71. The padding elements 80 can be any elastomeric material or like structure that is capable of cushioning the abutment of the upper sash 82 against the lower sash 70.

To clean the upper and lower sashes 70, 82, the lower sash 70 is first tilted inwardly and supported by the static support 20 in the manner previously described. The lower sash 70 is then cleaned in the conventional manner. Once clean, the padding elements 80 are placed on the peripheral framing 73 of the lower sash 70 in at least one position, but preferably at a plurality of positions. The upper sash 82 is then opened and tilted inwardly until the peripheral framing 83 of the upper sash 82 rests against the padding element 80 on the lower sash 70. The upper sash 82 is then cleaned and returned to its operating position.

Although the above described embodiments of the invention describe the best mode of the invention as derived by the inventor, it will be understood that a person skilled in the art of static support structures could make modifications and variations to the described embodiments by utilizing functionally equivalent components, varying proportions and/or creating alternate configurations. All such modifications and alternate design choices are intended to be covered by the scope of this application as defined by the appended claims.

What is claimed is:

1. A method of positioning a sash of a tilt-in window in a position suitable for washing, comprising the steps of:
   providing a free standing support;
   positioning said free standing support proximate the tilt-in window;
   adjusting said free standing support to a desired height; and
   tilting a sash from said tilt-in window to a point where the sash rests upon and is supported by said free standing support.

2. The method according to claim 1, wherein the sash has a peripheral frame and said step of positioning includes positioning said free standing support in a position whereby said support abuts against and supports the peripheral frame.

3. The method according to claim 2, further including the step of providing padding between the peripheral frame and said free standing support to prevent damage to said peripheral frame.

4. The method according to claim 2, wherein said peripheral frame has a predetermined width that extends in between two side edges and said method includes the step of providing an engagement means on said free standing support for engaging the two side edges of the peripheral frame, thereby preventing said free standing support from inadvertently moving away from the peripheral frame.

5. The method according to claim 2, wherein said free standing support includes a vertical member and at least one cross member pivotably coupled to said vertical member, wherein said step of adjusting said free standing support includes adjusting the height of said vertical member.

6. The method according to claim 5, further including the step of rotating said at least one cross member into a generally perpendicular orientation relative to said vertical member and locking said at least one cross member into place, wherein said at least one cross member abuts against and supports a length of said peripheral frame.

7. The method according to claim 1, wherein said tilt-in window is a double-hung window with an upper and lower sash and said method further includes the steps of:
   placing at least one pad on the lower sash after the lower sash has been tilted and rests upon said free standing support;
   tilting said upper sash onto said lower sash, wherein said at least one pad cushions the lower sash against the upper sash.

8. The method according to claim 1, wherein said step of providing a free standing support includes:
   providing a vertical member having an adjustment means disposed thereon for selectively adjusting the length thereof;
   providing a stand coupled to said vertical member, wherein said stand holds said vertical member in a generally vertical orientation;
   providing at least one cross member pivotably coupled to said vertical member, wherein said at least one cross member can be selectively pivoted into a position generally perpendicular to said vertical member;
   providing padding on a top surface of said at least one cross member; and
   providing at least one element extending from said at least one cross member that engages an edge of the sash, thereby retaining the sash in a predetermined orientation relative to the free standing support.

9. A static support for supporting the sash of a tilt-in window wherein the sash has a peripheral frame of a predetermined width that extends in between two side edges, said sash comprising:
   a vertical member having an adjustment means disposed thereon for selectively adjusting the length thereof;
   a stand coupled to said vertical member, wherein said stand holds said vertical member in a generally vertical orientation;
   at least one cross-member pivotably coupled to said vertical member, wherein said at least one cross member can be selectively pivoted into a position generally perpendicular to said vertical member;
   padding disposed on a top surface of said at least one cross member; and
   at least two elements that from said at least one cross member beyond said top surface that engage the two side edges of the peripheral frame at points generally opposite each another, thereby retaining the sash in a predetermined orientation relative to said static support.

10. The static support according to claim 8, further including a locking means for locking said at least one cross member in said position generally perpendicular to said vertical member.

11. The static support according to claim 8 having two cross members, herein an end of each cross member is pivotably coupled to said vertical member.

* * * * *